Feb. 2, 1943.  C. A. BROTHERTON  2,309,824
BUSHING ROLLING DEVICE
Filed July 25, 1940
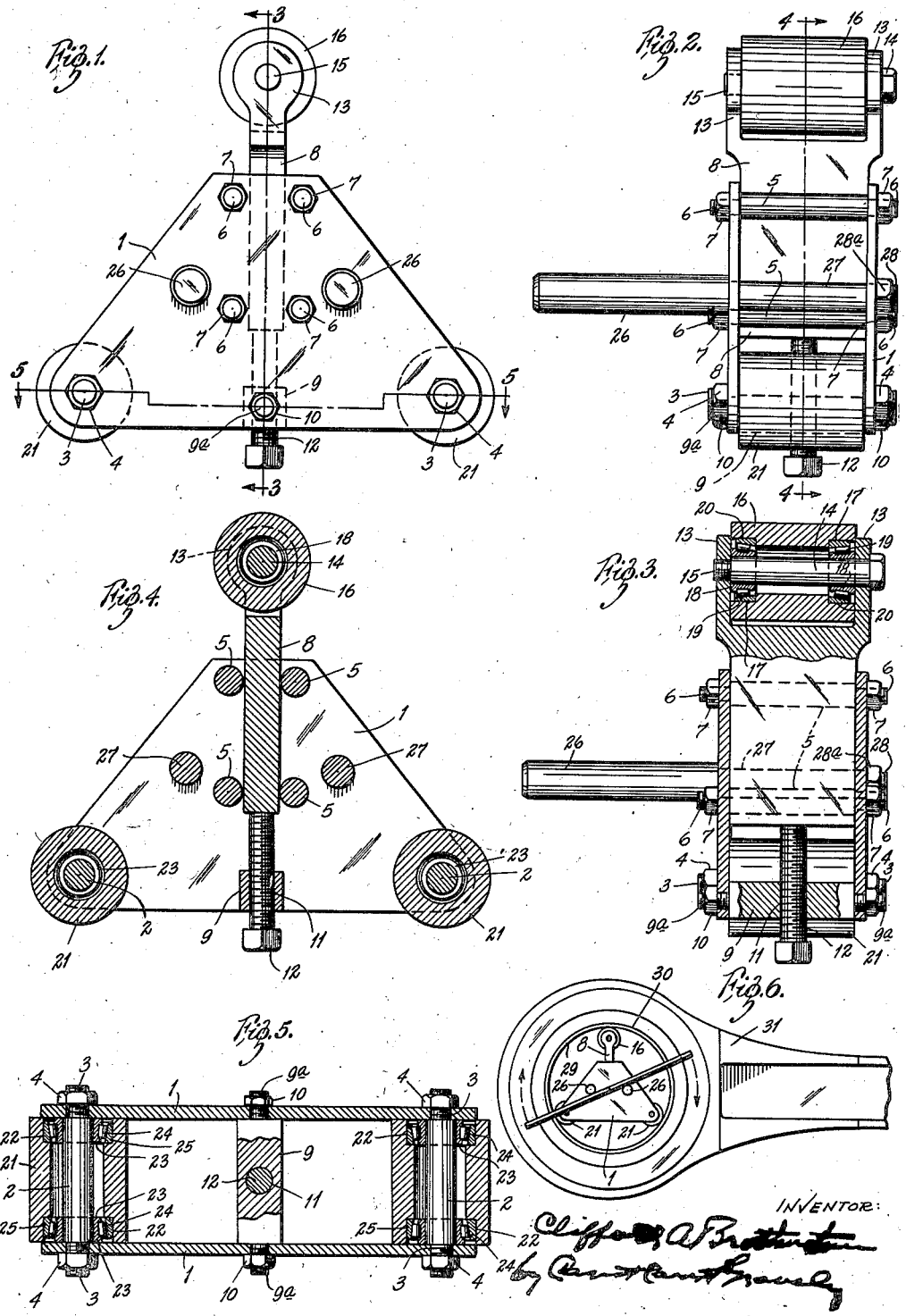

Patented Feb. 2, 1943

2,309,824

UNITED STATES PATENT OFFICE 2,309,824

BUSHING ROLLING DEVICE

Clifford A. Brotherton, Columbus, Ohio, assignor to The Timken Roller Bearing Company, Canton, Ohio, a corporation of Ohio Application July 25, 1940, Serial No. 347,361

1 Claim. (Cl. 153—79)

My invention relates to expanding and finishing tools and more particularly to a bushing rolling device for seating bushings in the eyes of locomotive rods.

The present day practice in installing bushings in the eyes or cross bores of locomotive rods, whether in the original assembly or in the replacement of worn bushings, is to press fit the bushings in place whenever possible, or to drive them into place with a block or copper hammer. Regardless of the method used, it is almost impossible to seat the bushings perfectly in the eyes of the locomotive rods especially so in the case of a replacement bushing for an eye or cross bore that has become worn or elongated through the stretching of the metal through use. Frequently, after a bushing is installed, it is necessary to remove it or to rebore or buff out the inside diameter to give proper clearances. It is also found in many cases after replacing a bushing that it is slightly loose in the rod and it is necessary to peen it in order to tighten the bushing so that the bore will not be damaged by allowing the bushing to run loose. Furthermore, the bushings now used in repairs are made oversized to compensate for increases in the size of rod eyes due to wear and elongation, and when the bushing is forced to seat in an elongated eye, it does not make a perfect fit and, therefore, tends to loosen quickly in service.

My invention has for its principal objects a tool for installing bushings in the eyes of locomotive rods; which will properly seat the bushing in the bore; and which will insure a tight fit in the bore whether the assembly is of new bushings or the replacement of bushings in worn rods. Another object is to devise a simple and inexpensive bushing rolling tool which may be used to install and tighten bushings in all types of cylinders; which will finish and smooth bushing surfaces and produce a true, round bushing regardless of the out-of-roundness of the cylindrical bore; and which will compress and toughen the surface of the bushings so that they will have a longer life. A further object is to devise a tool for installing a bushing in an eye of a locomotive rod or other cylindrical bore which will permit the use of bushings of less diameter than now is possible and which will permit the expanding of the bushings into place so that they will have a perfect fit in the bore.

My invention consists principally in providing three rollers mounted in a frame in such a manner as to define a cylinder when the frame is rotated and in providing adjusting devices for increasing the size of said cylinder and in providing means for rotating said frame. It further consists in the bushing rolling tool and in the parts and combinations and arrangements of parts, hereinafter described and claimed.

In the accompanying drawing, wherein like reference characters refer to like parts wherever they occur, Fig. 1 is a top plan view of a bushing rolling device embodying my invention, Fig. 2 is a side elevational view of device shown in Fig. 1, Fig. 3 is a sectional view taken on the line 3—3 in Fig. 1, Fig. 4 is a sectional view taken on the line 4—4 in Fig. 2, Fig. 5 is a sectional view taken on the line 5—5 in Fig. 1; and Fig. 6 is a top plan view of my bushing rolling device being used to roll a bushing in the eye of a locomotive rod.

As illustrated in the drawing, the bushing rolling device includes a frame formed by spacing two plates 1 apart. Each plate 1 is trapezoidal in shape, having a wide base portion and a narrow base portion with the sides tapering from the wide base portion toward the narrow. The plates are spaced apart in parallel planes by a number of shouldered pins having threaded end portions. At the corners of the wide base portions of the plates are two shouldered pins 2 whose threaded end portions 3 extend through perforations in the plates. Nuts 4 screwed on the threaded ends of the pins clamp the plates between the shoulders on the pins and said nuts. Four shouldered pins 5 having their threaded end portions 6 extending through perforations in the plates are positioned in the central and narrow base portions of the plates, two pins being at the narrow base portions and two in the central portion of said plates. Nuts 7 screwed on these pins clamp the plates between the shoulders on said pins and said nuts. These pins 5 are so positioned and alined as to form guides for a slide block 8 mounted in the frame between said plates. A shouldered pin 9 with threaded end portions 9a which extend through perforations in the wide base portion of the plates is secured by nuts 10 screwed on said threaded end portions. This pin 9 is positioned adjacent to the end of said slide block 8 and is alined therewith. Said pin 9 has a threaded opening 11 therethrough having a threaded adjusting screw 12 extending through said opening 11 and abutting against the end of said slide block 8. The outer end of said block has arms 13 in alinement with the planes of said plates 1, said arms 13 being perforated to receive a bolt 14 which extends thereacross. This bolt has a threaded end 15 screwed into one of the arms 13. A roller 16 is mounted on said bolt and has recesses 17 in the ends thereof for mounting roller bearings. The bearings comprise the usual inner raceway member 18 mounted on the bolt, rollers 19 thereon and outer raceway members 20 mounted in the recess and abutting against the ends thereof. Mounted on the pins 2 at the corners of the wide base portion of the frame are rollers 21 similar to the roller 16 mounted between the arms of the slide block. These rollers 21 also have recesses 22 at their ends in which are roller bearings similar to the roller bearings in the recess in the end of the roller 16 mounted between the arms of the slidable block. These roller bearings comprise the usual inner raceway member 23, rollers 24, and outer raceway members 25. These three rollers define a cylinder when the frame is rotated.

Lugs 26 having a reduced shank 27 and a threaded end portion 28 extend through perforations in said plates and their threaded ends are secured in place by nuts 28a. These lugs 26 extend some distance above the adjacent plate and serve as means for rotating said bushing rolling tool.

The operation of mounting a bushing in the eye of a locomotive rod is as follows: A bushing 29 is mounted around the three rollers which define a cylinder when the frame is rotated. The length of the rollers is equal to or greater than the length of the bushing to be rolled into the eye. The diameter of the bushing used is generally slightly less than the diameter of the bore 30 of the eye in the locomotive rod 31. The tool together with the bushing thereon is inserted in the eye and the bushing rolling device is rotated by means of a bar engaging the lugs. The rollers rotate as the frame is rotated and this rolling enlarges the diameter of the bushing 29 causing it to seat in the bore of the rod. From time to time, the adjusting screw 12 is turned to move the slide block 8 and roller carried thereby outwardly, thereby enlarging the cylinder defined by the three rolls. The tool is continually rotated and the rotation of the rollers causes the bushing to seat tighter and tighten the bore. The metal in the bushing, due to the rolling flows and compensates for any wear or elongation of the eye due to wear, while also insuring the roundness of the inside of the bushing and thereby making up for any out of roundness of the eye.

Obviously, numerous modifications may be made and I do not wish to be limited to the precise construction shown.

What I claim is:

A tool having a frame comprising an opposed pair of plates generally in the form of an isosceles triangle, a plurality of spacer elements holding said plates in spaced relationship, a pair of said elements extending between and perpendicular to said plates adjacent two corners and constituting axles for rollers, rollers mounted on said axles and extending beyond said corners, means between said plates adjacent the central portion thereof and forming a slideway, a slide-block sliding in said slideway and having a free end extending beyond the other corner of said frame, a roller rotatably mounted on said free end with its axis parallel to those of the other rollers, an element fixedly mounted between said plates having an internally threaded bore, a threaded bolt in said bore, said bolt being in alignment with said slide-block and having the inner end thereof abutting said slide-block with the outer end thereof extending beyond said frame, and means on the external face of one of said plates adapted to be engaged by an implement for the purpose of rotating said tool about an axis parallel to those of the rollers.

CLIFFORD A. BROTHERTON.